United States Patent [19]
Oppenheimer

[11] 3,906,632
[45] Sept. 23, 1975

[54] COOKING AND BARBEQUING UTENSIL

[76] Inventor: Robert H. Oppenheimer, 3410 Lake Shore Dr., Chicago, Ill. 60657

[22] Filed: Mar. 14, 1974

[21] Appl. No.: 451,040

[52] U.S. Cl. .................................................. 30/322
[51] Int. Cl.² ........................................ A47J 43/28
[58] Field of Search ............. 30/322, 162, 163, 335

[56] References Cited
UNITED STATES PATENTS

| | | | |
|---|---|---|---|
| 1,507,043 | 9/1924 | Blow | 30/162 X |
| 1,754,968 | 4/1930 | Smith | 30/322 X |
| 1,768,035 | 6/1930 | Domaratius | 30/163 |
| 1,809,254 | 6/1931 | Smith | 30/322 |
| 1,869,299 | 7/1932 | Bracht | 30/322 UX |
| 1,960,130 | 5/1934 | Trubel | 30/162 X |
| 2,291,514 | 7/1942 | Warner et al | 30/162 |
| 2,404,495 | 7/1946 | Hallum | 30/322 |
| 2,835,971 | 5/1958 | Neuman | 30/322 |
| 2,862,296 | 12/1958 | Anderson | 30/162 |
| 3,171,201 | 3/1965 | Carifi | 30/162 X |

*Primary Examiner*—Al Lawrence Smith
*Assistant Examiner*—J. T. Zatarga
*Attorney, Agent, or Firm*—George H. Gerstman

[57] ABSTRACT

A cooking utensil is provided in which a spatula or fork is fastened to a stem which is slidable within a handle. In its retracted position, the utensil is effectively operable as a cooking utensil, and in its extended position the utensil is effectively operable as a barbecue utensil. Outward extension of the stem is limited so that its accidental removal from the handle is prevented.

7 Claims, 9 Drawing Figures

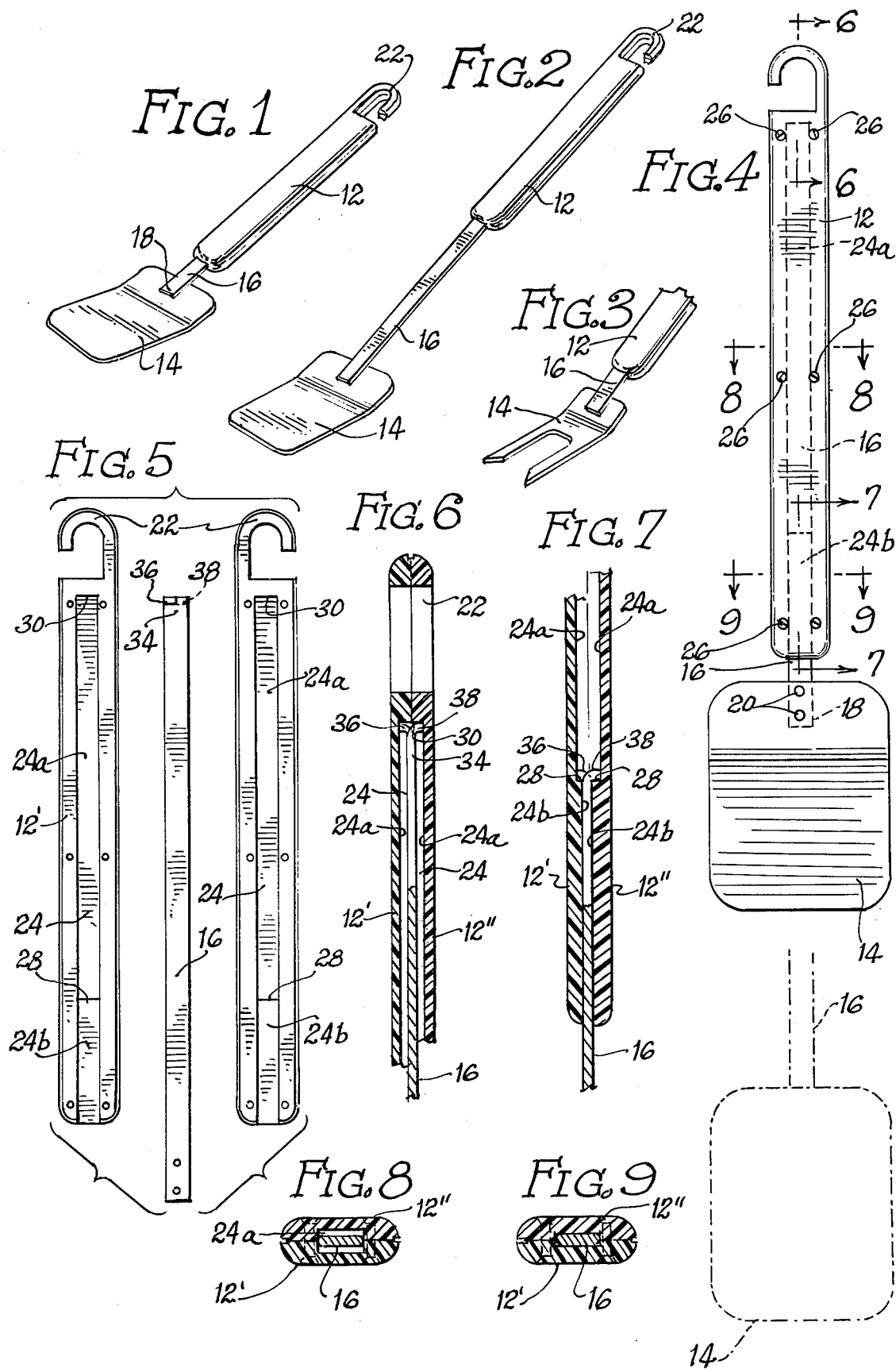

COOKING AND BARBEQUING UTENSIL

BACKGROUND OF THE INVENTION

This invention relates to a utensil which is useful both as a cooking and a barbecuing tool.

It is advantageous for a barbecue tool to be relatively long, so that the person using it with a hot barbecue grill will not be burned. Typical barbecue tools include spatulas and forks which are generally 18 inches long, or longer.

Because of the relatively great length of barbecue tools, they are difficult to store in the drawers in which typical cooking utensils are kept. Thus barbecue tools are usually hung in a separate location and many persons avoid purchasing barbecue tools because of the difficulty in storing them.

It is, therefore, an object of the present invention to provide a barbecue utensil which can be used, effectively and practically, as both a cooking and a barbecuing utensil.

A further object of the present invention is to provide a utensil which is extendable when used as a barbecue tool and retractable when used as a cooking tool.

A still further object of the present invention is to provide a barbecuing and cooking utensil which is simple to manufacture and relatively inexpensive in construction.

Other objects and advantages of the present invention will become apparent as the description proceeds.

BRIEF DESCRIPTION OF THE INVENTION

In accordance with the present invention, there is provided a utensil having an instrumental portion (such as a spatula or a fork) for handling food and a manually graspable handle. The improvement comprises a stem coupling the instrumental portion to the handle. Means rigidly fasten one end of the stem to the instrumental portion. The handle defines an opening for slidably receiving the other end of the stem and the stem is slidable within the opening.

Means are provided for limiting the outward extension of the stem to prevent its accidental removal from the handle. The slidable stem is operable to provide a cooking utensil when the stem is in a retracted position and a barbecue utensil when the stem is in an extended position.

In the illustrative embodiment, the outward extension limiting means comprises a shoulder communicating with the opening and a lateral flange connected to the stem for abutment with the shoulder when the stem reaches its extended position.

A more detailed explanation of the invention is provided in the following description and claims, and is illustrated in the accompanying drawing.

BRIEF DESCRIPTION OF THE DRAWING

FIG. 1 is a perspective view of a utensil constructed in accordance with the principles of the present invention, in its retracted position;

FIG. 2 is a perspective view of the utensil of FIG. 1, in its extended position;

FIG. 3 is a fragmentary view of a modified instrumental portion of the utensil of FIGS. 1 and 2;

FIG. 4 is a front view of the cooking utensil of FIGS. 1 and 2;

FIG. 5 is a exploded view of the handle and stem portions of the utensil of FIGS. 1 and 2;

FIG. 6 is a cross-sectional view taken along the line 6—6 of FIG. 4;

FIG. 7 is a cross-sectional view taken along the line 7—7 of FIG. 4;

FIG. 8 is a cross-sectional view taken along the line 8—8 of FIG. 4; and

FIG. 9 is a cross-sectional view taken along the line 9—9 of FIG. 4.

DETAILED DESCRIPTION OF THE ILLUSTRATIVE EMBODIMENT

Referring to the figures, the utensil shown therein includes a manually graspable handle 12, instrumental portion 14, and a stem 16. Instrumental portion 14 may be a spatula as shown in FIGs. 1, 2 and 4, or it may be a fork as shown in FIG. 3. Other types of instrumental portions, such as a spoon, could also be provided.

Spatula 14 is fastened to one end 18 of stem 16 by suitable fastening means 20, such as rivets or screws. Stem 16 is slidable with handle 12, as will be described below.

Handle 12 is preferably molded of a plastic material, includes a hook 22 for hanging, and is formed in two sections 12' and 12". Each of these sections defines a slot 24 which forms an opening when sections 12' and 12" are mated. Although FIG. 4 shows the mated handle portions being connected by screws 26, other fastening means, such as rivets or cement, could be utilized if desired.

The upper portion 24a of slot 24 has a greater depth than the lower portion 24b thereof. In this manner, as shown most clearly in FIG. 7, a pair of shoulders 28 are formed communicating with the opening 24. The wall 30, defining the top of opening 24, acts as a member to limit the retraction of stem 16.

The top 34 of stem 16 is bifurcated to form oppositely extending bend portions 36 and 38 as shown most clearly in FIGS. 5, 6 and 7. Bend portions 36 and 38 are adapted to abut wall 30 when stem 16 is in its retracted position, and are adapted to abut opposed shoulders 28, 28 (see FIG. 7) when stem 16 is in its extended position. In this manner, a device is provided to prevent accidental removal of the stem from the handle.

For storage or for use as a cooking utensil, the stem is placed in its retracted position as shown in FIGS. 1 and 4. When it is desired to use the device as a barbecue tool, the stem is extended to the position shown in FIG. 2 (in phantom lines in FIG. 4), whereby oppositely extending bend portions 36 and 38 will abut opposed shoulders 28, 28 as shown in FIG. 7.

It is seen that a utensil has been provided which can readily be utilized as either a cooking or barbecue utensil, and is simple in construction and relatively inexpensive to manufacture.

Although an illustrative embodiment of the invention has been shown and described, it is to be understood that various modifications and substitutions may be made by those skilled in the art without departing from the spirit and scope of the present invention.

What is claimed is:

1. In a cooking utensil having an instrumental portion for handling food and a manually graspable handle, the improvement comprising: a stem coupling said instrumental portion to said handle; means rigidly fastening one end of said stem to said instrumental portion; said handle defining an opening for slidably receiving the other end of said stem and said stem being slidable within said opening; means for limiting the outward extension of said stem to prevent its accidental removal from said handle, said slidable stem being operable to provide a cooking utensil when said stem is in a retracted position and a barbecue utensil when said stem is in an extended position, said outward extension limiting means comprising a shoulder communicating with said opening and a lateral flange connected to said stem and being located internally within said handle for abutment with said shoulder when said stem reaches its extended position.

2. A device as described in claim 1, said lateral flange comprising a bend portion formed integrally with said stem.

3. A device as described in claim 1, and further including means for limiting retraction of said stem.

4. A device as described in claim 1, said outward extension limiting means comprising a pair of opposed shoulders communicating with said opening, a pair of oppositely extended flanges connected to said stem, each flange being located internally within said handle and adapted for abutment with one of said shoulders when said stem reaches its extended position.

5. A device as described in claim 4, said flanges each comprising an oppositely extending bend portion formed integrally with said stem.

6. A device as described in claim 1, said instrumental portion being a fork.

7. In a cooking utensil having an instrumental portion for handling food and a manually graspable handle, the improvement comprising: a stem coupling said instrumental portion to said handle; means rigidly fastening one end of said stem to said instrumental portion; said handle defining an opening for slidably receiving the other end of said stem and said stem being slidable within said opening; means for limiting the outward extension of said stem to prevent its accidental removal from said handle, said outward extension limiting means comprising a pair of opposed shoulders communicating with said opening, a pair of oppositely extending flanges being connected to said stem, each flange being located internally within said handle and adapted for abutment with one of said shoulders when said stem reaches its extended position, said flanges each comprising an oppositely extending bend portion formed integrally with said stem; means for limiting retraction of said stem; said slidable stem being operable to provide a cooking utensil when said stem is in a retracted position and a barbecue utensil when said stem is in an extended position.

* * * * *